United States Patent Office.

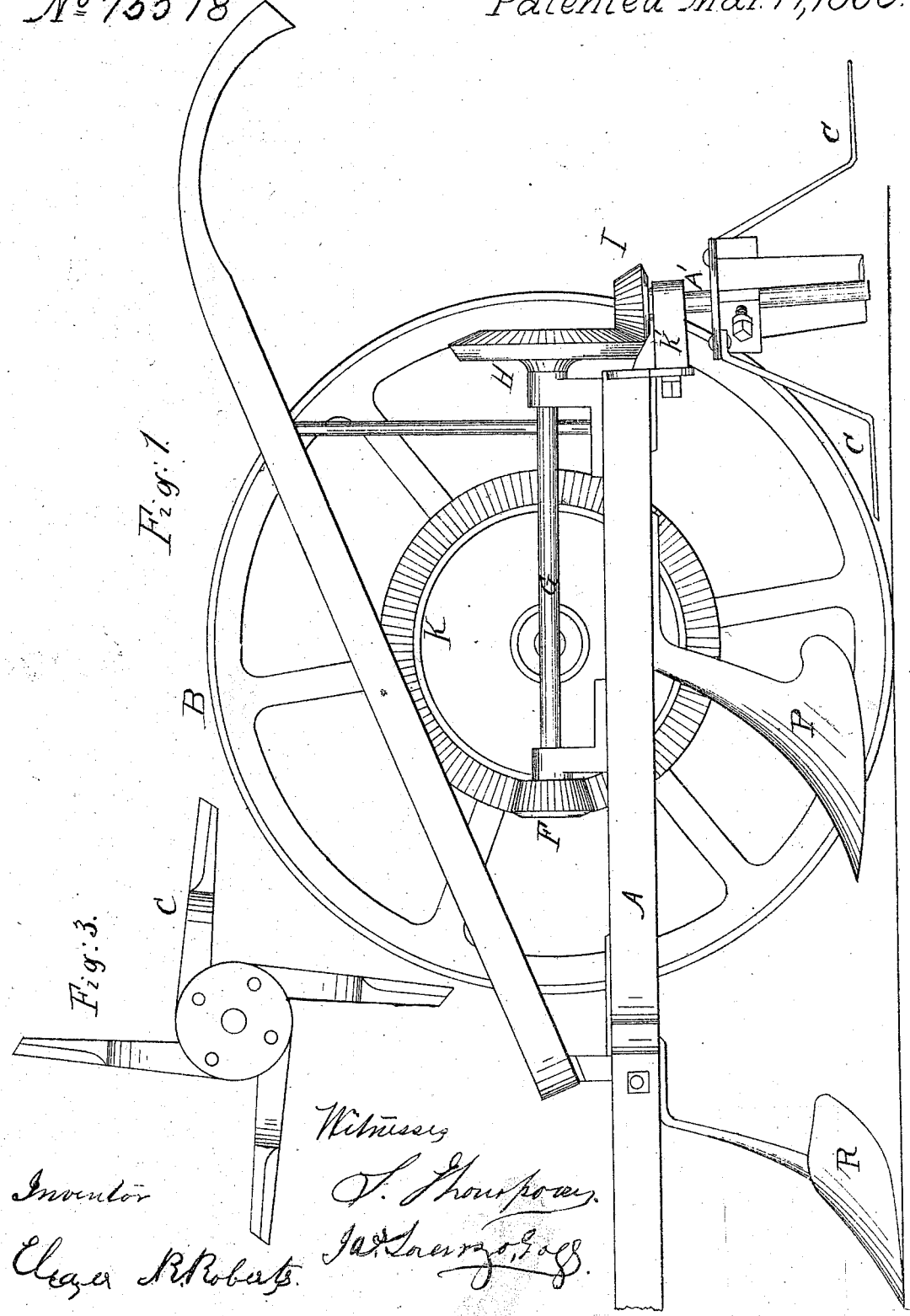

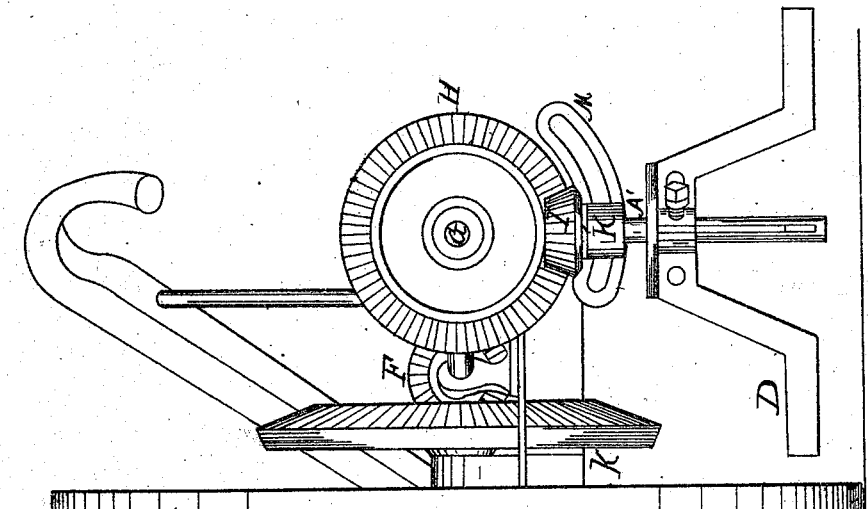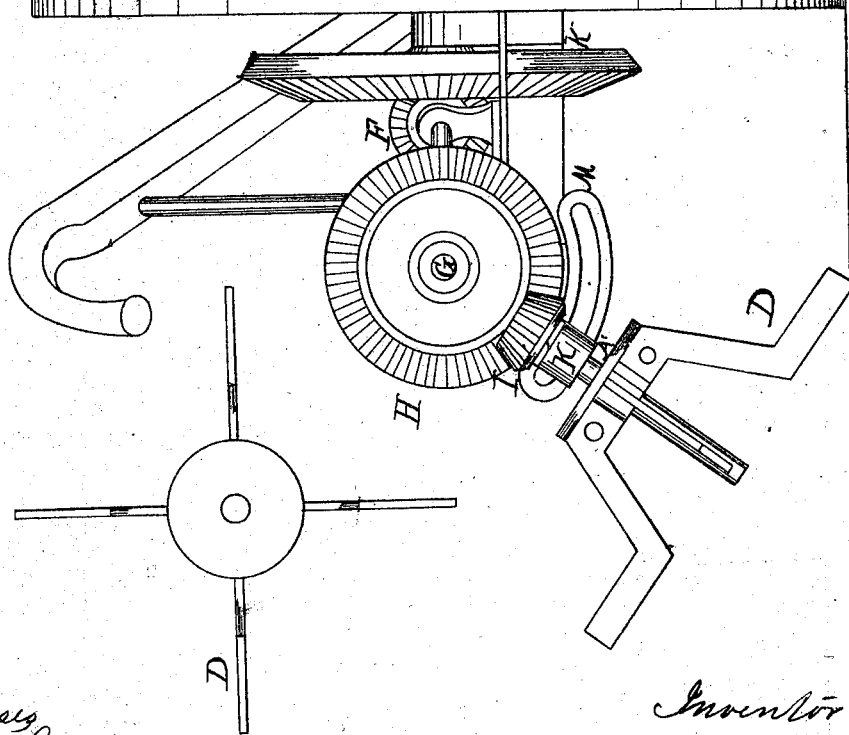

ELEAZER B. ROBERTS, OF ROCHESTER, NEW YORK.

*Letters Patent No. 75,578, dated March 17, 1868.*

---

IMPROVEMENT IN CULTIVATORS.

---

*The Schedule referred to in these Letters Patent and making part of the same.*

---

TO ALL WHOM IT MAY CONCERN:

Be it known that I, ELEAZER B. ROBERTS, of the city of Rochester, in the State of New York, have invented a new and useful Improved Cultivator; and I do hereby declare that the following is a full, clear, and exact description thereof, reference being had to the accompanying drawing, making part of this specification, in which—

Figure 1 is a side view with my weed-cutter attached.

Figure 2 is a rear view with my rotary hoes attached.

Figure 3 is a top view of the weed-cutter as detached from the cultivator.

Figure 4 is a top view of the rotary hoes detached from the cultivator.

Like letters indicate corresponding parts.

This invention consists in constructing a cultivator with weed-cutters or revolving hoes, the one to be substituted for the other in the different operations of cultivating and weeding corn, potatoes, &c.

To enable others to make and use my invention, I will describe its construction and operation.

I suspend a suitable frame, A, on the axle of a wheel, B. This wheel supports the frame and its attachments, and also serves to give motion to a weed-cutter, C, or rotating hoes, D, to be attached on the end of the frame A. On each end of the axle of the wheel B, I key a bevel-wheel, K, which gears into a bevel-pinion, F, on a shaft, G, on each side of the wheel B. The shaft G extends back to the rear of the machine, and on the rear end I put a bevel-wheel, H, which gears into the pinion I on shaft A', which carries the weed-cutters C or rotating hoes D. The shaft A' is sustained by a journal-box, K', fastened to a slotted arm, M, which is fastened on the rear of the frame by bolts. The top of the shaft A' is inclined forward, and the slotted arm M is made in the form of a segment of a circle to give the rotary hoes any desired angle laterally to the surface of the ground. The weed-cutters C are made in form as shown in figs. 1 and 3, and as many as are desired are fastened to a head that is held to its place on the shaft A', by a set-screw, or other suitable device, when intended for use. The rotary hoes are made in the form as shown in figs. 2 and 4, and put on the shaft A' in a similar manner to the weed-cutters. On the bottom of the frame A, on each side of the driving-wheel B, I bolt a cultivator-tooth, P. In front of the wheel I put a double cultivator-tooth, R. I also attach to the top of the frame two handles in front of the wheel B, which extend back as far as will be convenient for use to guide the cultivator.

The mode of using this machine is: On first going over the ground planted with potatoes, corn, &c., the weed-cutters are attached to the shaft A', which, being inclined forward at the top, causes the cutters to enter the ground as they revolve to the front, and leave it as they pass to the rear, as shown in fig. 1. On the second cultivating, the rotary hoes are substituted for the weed-cutters. The revolving hoes can be placed at any desired angle to the surface of the ground, laterally, by means of the slotted arm M, as shown in fig. 2, for the purpose of throwing the dirt up to form any desired-shaped hill around the corn, &c., or to add as much soil to the hill as is required.

The operation of this combined cultivator and weed-cutter or rotary hoes is such that when the weed-cutter is attached, the revolving wheel B gives motion to the shaft G, thereby imparting motion to the shaft A', and revolves the weed-cutter C. The cultivator-teeth ploughing the ground, the weed-cutters separate the weeds from their roots. Then, on taking off the weed-cutters and putting on the rotary hoes, the soil is gathered to the corn, or potatoes, &c., as required, and the weeds are brought to the top of the ground to die. This machine does away with hand-hoeing entirely. The wheels K may be made to move on the axle in and out, and the outsides of the frame also may be made to move in and out by adjustable bars at each end to regulate the distance between the cutters or hoes, as either are in use.

What I claim as my invention, and desire to secure by Letters Patent, is—

1. The application, to cultivators, of rotary weed-cutters hung on a vertical shaft, and operating substantially in the manner herein shown and described, and for the purposes set forth.

2. The application, to cultivators, of rotating hoes hung on a vertical shaft, and operating substantially in the manner herein shown and described, and for the purposes set forth.

3. The arrangement of the arm M, in combination with the rotary hoe D, substantially in the manner and for the purposes herein shown and described.

ELEAZER B. ROBERTS.

Witnesses:
L. KARSHOO,
JAS. LORENZO GAGE.